(12) United States Patent
Aramoto et al.

(10) Patent No.: US 9,739,319 B2
(45) Date of Patent: Aug. 22, 2017

(54) DRIVING FORCE TRANSMISSION APPARATUS

(71) Applicant: JTEKT CORPORATION, Osaka-shi, Osaka (JP)

(72) Inventors: Gento Aramoto, Osaka (JP); Tomoya Yamatani, Toyota (JP)

(73) Assignee: JTEKT CORPORATION, Osaka-shi (JP)

( * ) Notice: Subject to any disclaimer, the term of this patent is extended or adjusted under 35 U.S.C. 154(b) by 0 days.

(21) Appl. No.: 15/296,775

(22) Filed: Oct. 18, 2016

(65) Prior Publication Data

US 2017/0122385 A1    May 4, 2017

(30) Foreign Application Priority Data

Oct. 28, 2015    (JP) ................................ 2015-212224

(51) Int. Cl.
| | |
|---|---|
| *F16D 13/04* | (2006.01) |
| *F16D 41/066* | (2006.01) |
| *F16D 15/00* | (2006.01) |
| *F16D 41/06* | (2006.01) |

(52) U.S. Cl.
CPC .......... *F16D 41/066* (2013.01); *F16D 15/00* (2013.01); *F16D 2041/0605* (2013.01)

(58) Field of Classification Search
CPC ....................... F16D 41/066; F16D 2041/0605
See application file for complete search history.

(56) References Cited

U.S. PATENT DOCUMENTS

| | | | | |
|---|---|---|---|---|
| 1,726,329 A | | 8/1929 | Aiken | |
| 3,404,760 A | * | 10/1968 | Benson ................. | F16D 41/067 192/45.012 |
| 4,422,537 A | * | 12/1983 | Ritter .................... | F16D 41/067 192/45.015 |
| 5,014,833 A | * | 5/1991 | Johnston ............... | F16D 41/067 192/41 R |
| 7,137,497 B2 | * | 11/2006 | Wehr .................... | F16D 41/067 192/45.008 |

(Continued)

FOREIGN PATENT DOCUMENTS

| | | |
|---|---|---|
| DE | 11 2009 001390 T5 | 6/2011 |
| FR | 1 004 826 A | 4/1952 |
| JP | 2013-092191 A | 5/2013 |

OTHER PUBLICATIONS

Mar. 28, 2017 Extended European Search Report issued in European Application No. 16195829.3.

*Primary Examiner* — David J Hlavka
(74) *Attorney, Agent, or Firm* — Oliff PLC

(57) ABSTRACT

Displacement of a switching member in a first direction causes rolling elements of each pair to come out of engagement with an outer peripheral portion or an inner peripheral portion and form clearances therewith, resulting in an OFF state of a driving force transmission apparatus. Displacement of the switching member in a second direction causes a downstream one of the rolling elements of each pair in the direction of rotation to come into zero clearance engagement with the outer peripheral portion and the inner peripheral portion, with a clearance formed between an upstream one of the rolling elements of each pair and the outer peripheral portion or the inner peripheral portion, resulting in an ON state of the driving force transmission apparatus.

4 Claims, 10 Drawing Sheets

(56) References Cited

U.S. PATENT DOCUMENTS

| | | | |
|---|---|---|---|
| 2007/0163853 A1 | 7/2007 | Wittkopp | |
| 2008/0179156 A1* | 7/2008 | Byun | F16D 41/066 192/45.1 |
| 2010/0051402 A1* | 3/2010 | Yamamoto | F16D 41/066 192/45.011 |
| 2010/0314212 A1 | 12/2010 | Akiyoshi et al. | |
| 2015/0068858 A1* | 3/2015 | Seith | F16D 41/066 192/45.004 |
| 2016/0348728 A1* | 12/2016 | Chen | F16C 33/7809 |
| 2016/0348740 A1* | 12/2016 | Kitayama | F16D 27/108 |
| 2017/0009821 A1* | 1/2017 | Fukunari | F16D 27/10 |

* cited by examiner

DRIVING FORCE TRANSMISSION APPARATUS

INCORPORATION BY REFERENCE

The disclosure of Japanese Patent Application No. 2015-212224 filed on Oct. 28, 2015 including the specification, drawings and abstract is incorporated herein by reference in its entirety.

BACKGROUND OF THE INVENTION

1. Field of the Invention

The invention relates to a driving force transmission apparatus that switches between an on state in which a rotational force is transmitted between a first shaft and a second shaft and an off state in which no rotational force is transmitted between the first shaft and the second shaft.

2. Description of Related Art

Japanese Patent Application Publication No. 2013-092191 (JP 2013-092191 A) discloses a rotation transmission apparatus including a two-way clutch. In the two-way clutch, rollers of each pair disposed between an inner ring and an outer ring are each retained by a controlling cage and a rotational cage. Energizing a magnet coil provided in the rotation transmission apparatus exerts a force on the controlling cage. This force causes the controlling cage and the rotational cage to rotate relative to each other in a direction in which the circumferential widths of pockets defined between the controlling cage and the rotational cage decrease. Thus, the rollers of each pair are pressed by the controlling retainer and the rotational retainer, moved close to each other, and disengaged from the inner ring and the outer ring. As a result, the two-way clutch enters a disengaged state.

De-energizing the magnet coil allows the controlling cage and the rotational cage to be rotatable. Pressing forces from elastic members cause the controlling cage and the rotational cage to rotate relative to each other in a direction in which the circumferential widths of the pockets increase. Thus, the rollers of each pair come into engagement with the inner ring and the outer ring, so that a torque is transmitted between the inner ring and the outer ring through the rollers.

When the two-way clutch of the rotation transmission apparatus disclosed in JP 2013-092191 A is in an engaged state, the rollers of each pair pressed by the associated elastic member are both in engagement with the inner ring and the outer ring. Suppose that the rotational cage and the controlling cage are rotated relative to each other so as to switch the two-way clutch from the engaged state to the disengaged state. In this case, at least one of the rollers of each pair may fail to disengage from the inner ring or the outer ring. Thus, the two-way clutch may be unable to smoothly change from the engaged state to the disengaged state.

SUMMARY OF THE INVENTION

An object of the invention is to provide a driving force transmission apparatus that smoothly switches between an on state in which a rotational force is transmitted between a first shaft and a second shaft and an off state in which no rotational force is transmitted between the first shaft and the second shaft.

According to an aspect of the invention, a driving force transmission apparatus is disposed between a first shaft and a second shaft that are coaxial with each other. The apparatus is configured to switch between an on state in which a rotational force is transmitted between the first shaft and the second shaft and an off state in which no rotational force is transmitted between the first shaft and the second shaft. The apparatus includes an outer peripheral portion, an inner peripheral portion, a space, at least one pair of rolling elements, an elastic body, and a switching member. The outer peripheral portion is disposed on the first shaft. The inner peripheral portion is disposed on the second shaft. The inner peripheral portion faces the outer peripheral portion. The space is defined between the outer peripheral portion and the inner peripheral portion. The space includes at least one relatively large sub-space and at least two relatively small sub-spaces. The relatively small and relatively large sub-spaces are disposed alternately in a circumferential direction of the first and second shafts. The at least one pair of rolling elements is disposed in the space. The elastic body is configured to elastically urge the rolling elements of the at least one pair away from each other in the circumferential direction. The switching member is disposed in the space so as to be displaceable in an axial direction of the first and second shafts. The axial direction includes a first direction and a second direction opposite to the first direction. Displacement of the switching member in the first direction causes the rolling elements of the at least one pair to move close to each other in the circumferential direction against elastic urging force from the elastic body and move to the relatively large sub-space, so that the rolling elements of the at least one pair each come out of engagement with the outer peripheral portion or the inner peripheral portion and each form a clearance therewith in the space, resulting in the off state of the apparatus. Displacement of the switching member in the second direction causes the rolling elements of the at least one pair to move away from each other under the elastic urging force and move to the relatively small sub-spaces, so that a downstream one of the rolling elements of the at least one pair in a direction of rotation comes into zero clearance engagement with the outer peripheral portion and the inner peripheral portion, with a clearance formed between an upstream one of the rolling elements of the at least one pair in the direction of rotation and the outer peripheral portion or the inner peripheral portion, resulting in the on state of the apparatus.

BRIEF DESCRIPTION OF THE DRAWINGS

The foregoing and further features and advantages of the invention will become apparent from the following description of example embodiments with reference to the accompanying drawings, wherein like reference characters are used to represent like elements and wherein.

DETAILED DESCRIPTION OF EMBODIMENTS

Figure 1:
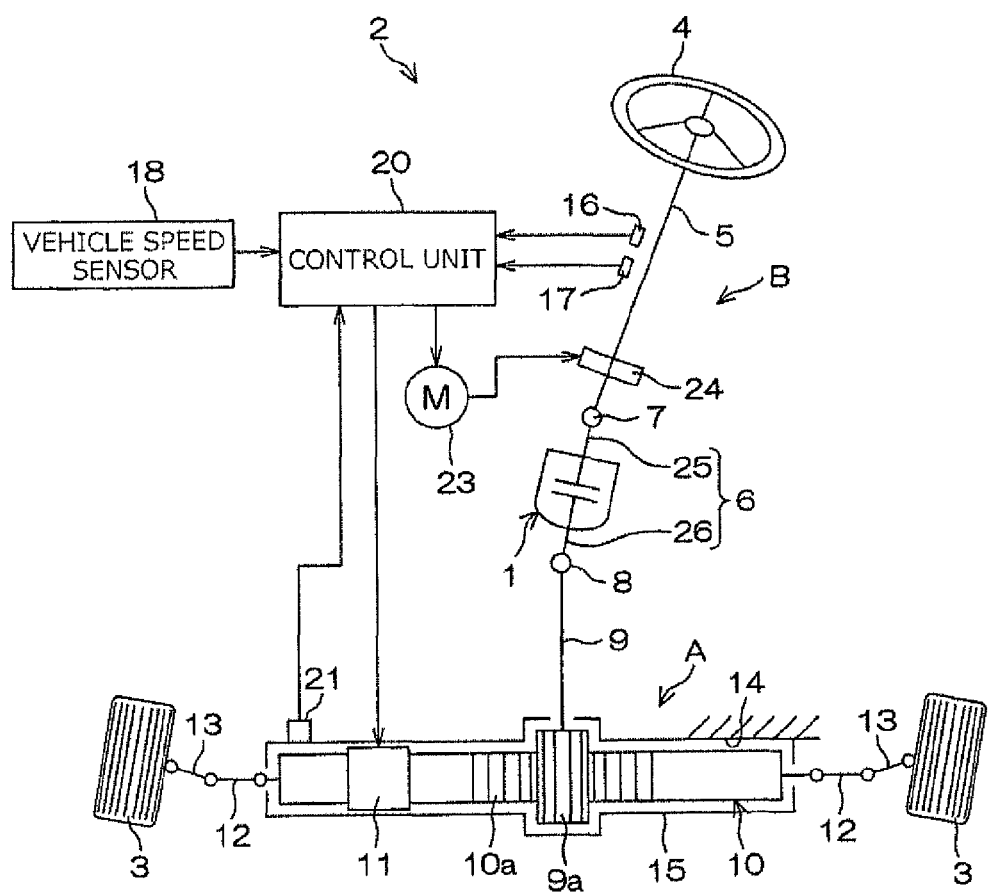
FIG. 1 is a diagram illustrating a schematic configuration of a steering system equipped with a driving force transmission apparatus according to an embodiment of the invention.

Embodiments of the invention will be described in detail below with reference to the accompanying drawings. FIG. 1 is a diagram illustrating a schematic configuration of a steering system 2 equipped with a driving force transmission apparatus 1 according to an embodiment of the invention. The steering system 2 includes: a steering mechanism B; and a steering operation mechanism A. The steering mechanism B includes: a steering member 4, such as a steering wheel; and a steering shaft 5. The steering operation mechanism A is configured to steer steered wheels 3. Specifically, a steering force generated by the steering mechanism B is transmitted from the steering shaft 5 to the pinion shaft 9, so that the pinion 9a causes the steering operation mechanism A to steer the steered wheels 3. In the steering system 2, the driving force transmission apparatus 1 according to the embodiment of the invention is interposed between the steering shaft 5 and the pinion shaft 9. The driving force transmission apparatus 1 switches between an on state in which a rotational force is transmitted from the steering shaft 5 to the pinion shaft 9 and an off state in which no rotational force is transmitted from the steering shaft 5 to the pinion shaft 9. When the driving force transmission apparatus 1 is in the off state, the steering force generated by the steering mechanism B is not mechanically transmitted to the steering operation mechanism A, but the steering operation mechanism A is driven using an electrical and electronic control system, which is known as a "steer-by-wire" system.

The steering operation mechanism A includes a steering operation shaft 10, a steering actuator 11, a pair of tie rods 12, and a pair of knuckle arms 13. One end of each tie rod 12 is coupled to an associated one of the ends of the steering operation shaft 10. The other end of each tie rod 12 is coupled to an associated one of the steered wheels 3 via an associated one of the knuckle arms 13. The steering operation shaft 10 is moved in its axial direction (i.e., in the width direction of a vehicle) so as to change steered angles of the steered wheels 3. The steering actuator 11 includes a motor (not illustrated) and a motion converting mechanism (not illustrated). The motion converting mechanism is, for example, a ball screw device to convert a driving force produced by the motor into an axial movement of the steering operation shaft 10.

The steering system 2 further includes a rack housing 15 that houses the steering operation shaft 10 and a portion of the pinion shaft 9 provided with the pinion 9a. The rack housing 15 is fixed to a vehicle body 14. The steering mechanism B further includes a steering angle sensor 16 and a torque sensor 17. The steering angle sensor 16 detects a steering angle of the steering member 4. The torque sensor 17 detects a steering torque applied to the steering member 4. The steering mechanism 13 further includes a steered angle sensor 21 and a vehicle speed sensor 18. The steered angle sensor 21 detects steered angles of the steered wheels 3. The vehicle speed sensor 18 detects a vehicle speed. Detection signals from various sensors, including the steering angle sensor 16, the torque sensor 17, the steered angle sensor 21, and the vehicle speed sensor 18, are input to a control unit 20, such as an electronic control unit (ECU).

When a driver operates the steering member 4 so as to rotate the steering shaft 5, the control unit 20 sets a target steered angle on the basis of the steering angle detected by the steering angle sensor 16 and the vehicle speed detected by the vehicle speed sensor 18. The control unit 20 drives and/or controls the steering actuator 11 on the basis of a difference between the target steered angle and the steered angle detected by the steered angle sensor 21. Thus, the driver is allowed to operate the steering operation mechanism A using the steering member 4.

On the basis of the detection signals output from, for example, the torque sensor 17 and the steering angle sensor 16, the control unit 20 drives and/or controls a motor 23 so that a suitable reaction force acting opposite to the direction in which the steering member 4 is turned is applied to the steering member 4. The output rotation of the motor 23 is decelerated (i.e., amplified) by a speed reducer 24 and then transmitted to the steering member 4 through the steering shaft 5. As previously mentioned, the driving force transmission apparatus 1 according to the embodiment of the invention is interposed between the steering shaft 5 and the pinion shaft 9. The driving force transmission apparatus 1 implements a fail-safe mechanism for the steering system 2.

The driving force transmission apparatus 1 is involved in operation of an intermediate shaft 6 including an input shaft 25 and an output shaft 26. One end of the intermediate shaft 6 is coupled to the steering shaft 5 through a universal joint 7. The other end of the intermediate shaft 6 is coupled to one end of the pinion shaft 9 through a universal joint 8. The pinion shaft 9 is provided at its other end with the pinion 9a. The pinion 9a meshes with a rack 10a of the steering operation shaft 10.

The intermediate shaft 6 includes the input shaft 25 and the output shaft 26. The input shaft 25 is a first shaft coupled to the steering shaft 5. The output shaft 26 is a second shaft coupled to the pinion shaft 9. The input shaft 25 and the output shaft 26 are coaxial with each other. The driving force transmission apparatus 1 is provided between the input shaft 25 and the output shaft 26. The driving force transmission apparatus 1 is switchable between the on state in which a rotational force is transmitted between the input shaft 25 and the output shaft 26 and the off state in which no rotational force is transmitted between the input shaft 25 and the output shaft 26.

During normal vehicle driving, the control unit 20 places the driving force transmission apparatus 1 in the off state, thus mechanically decoupling the steering member 4 from the steering operation mechanism A. In contrast, when the ignition of the vehicle is off or in the event of an abnormal condition, such as a malfunction in the steer-by-wire system, the control unit 20 places the driving force transmission apparatus 1 in the on state, thus mechanically coupling the steering member 4 to the steering operation mechanism A.

With the steering member 4 mechanically coupled to the steering operation mechanism A, an operation performed on the steering member 4 by the driver causes the steering member 4 to rotate, so that a steering force responsive to the rotation is transmitted from the steering member 4 to the steering shaft 5. The steering force is transmitted to the pinion shaft 9 through the steering shaft 5 and the intermediate shaft 6 so as to rotate the pinion shaft 9. The rotation of the pinion shaft 9 is converted into an axial motion of the steering operation shaft 10. The axial motion of the steering operation shaft 10 changes the steered angles of the steered wheels 3. Thus, the driver is allowed to directly operate the steering operation mechanism A using the steering member 4.

Figure 2:
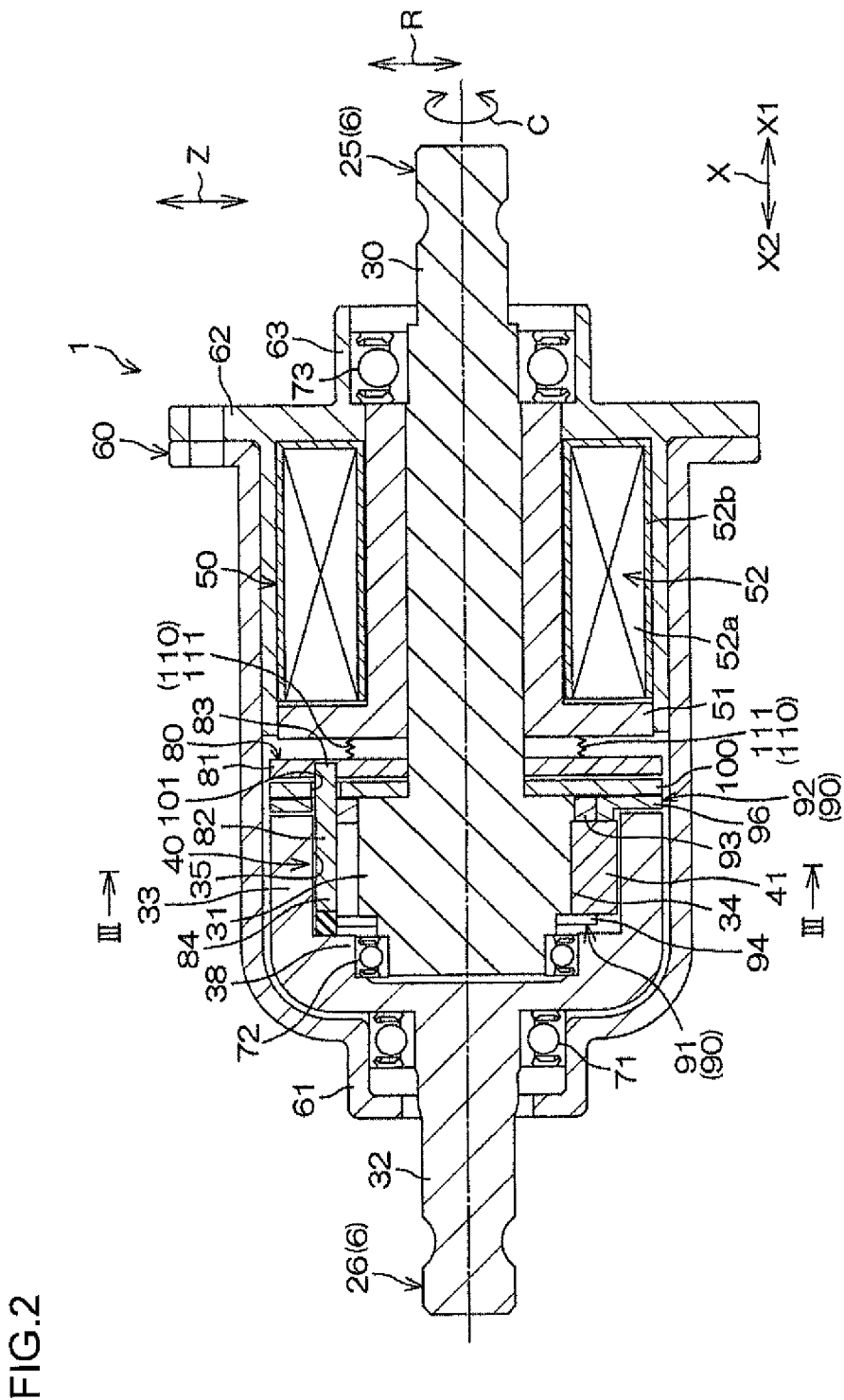
FIG. 2 is a cross-sectional view of the driving force transmission apparatus and its adjacent components.
Figure 3:
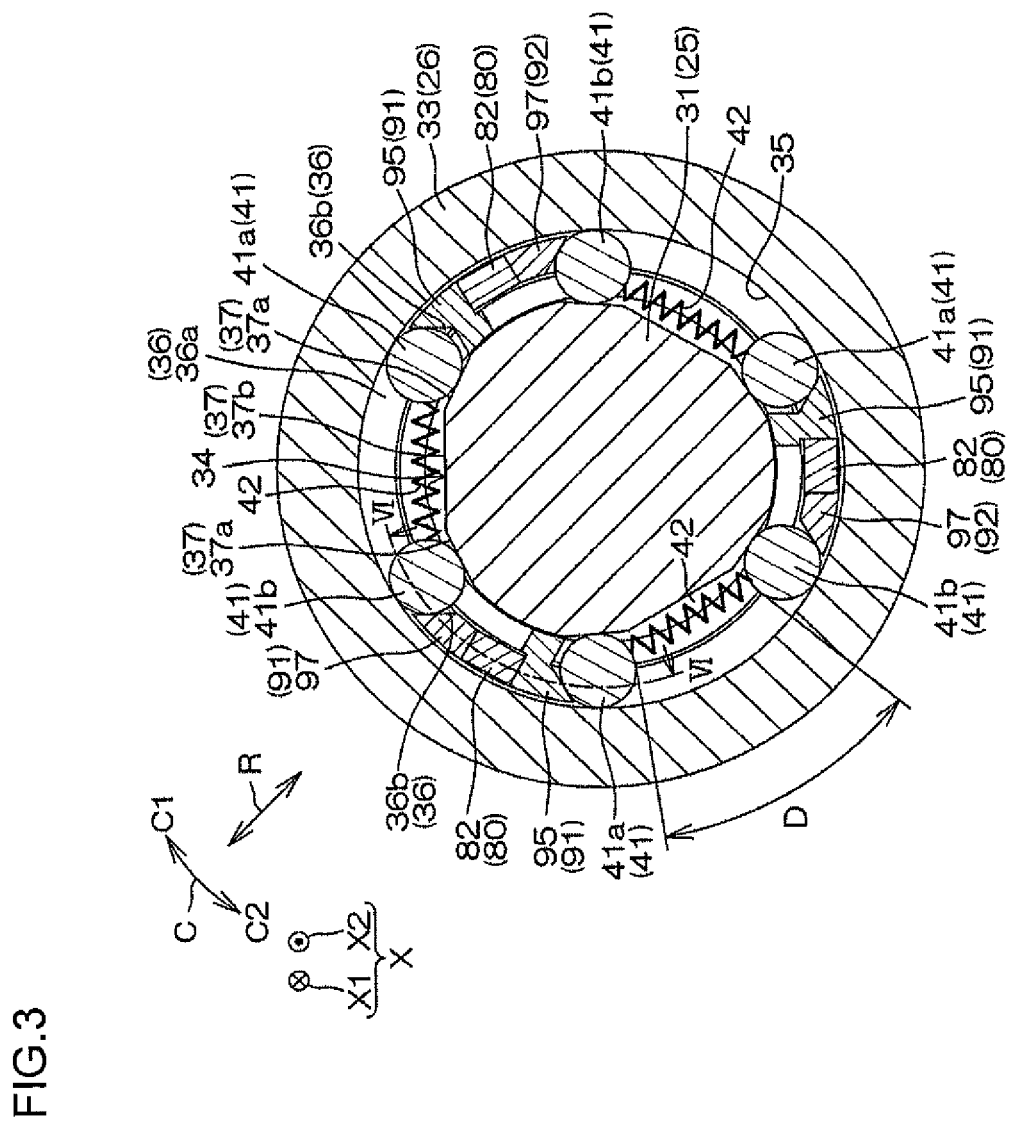
FIG. 3 is a cross-sectional view taken along the line in FIG. 2.

The driving force transmission apparatus 1 may be used not only for intermediate shafts of various steering systems but also for other shafts of the steering systems. For example, the driving force transmission apparatus 1 may also be used for shafts utilized in applications other than steering systems (e.g., a main spindle of a machine tool, a shaft provided with a propeller for wind power generation, and a train axle). FIG. 2 is a cross-sectional view of the driving force transmission apparatus 1 and its adjacent components. FIG. 3 is a cross-sectional view taken along the line in FIG. 2.

Turning now to FIG. 2, the axial direction of the input shaft 25 and the output shaft 26 will hereinafter be referred to as an "axial direction X". The axial direction X includes a first direction X1 and a second direction X2. As used herein, the term "first direction X1" refers to the direction from the output shaft 26 to the input shaft 25 (i.e., the direction toward the right end of FIG. 2), and the term "second direction X2" refers to the direction from the input shaft 25 to the output shaft 26 (i.e., the direction toward the left end of FIG. 2). The second direction X2 is opposite to the first direction X1. The radial direction of the input shaft 25 and the output shaft 26 will be referred to as a "radial direction R". The circumferential direction of the input shaft 25 and the output shaft 26 will be referred to as a "circumferential direction C". The circumferential direction C includes a direction C1 and a direction C2. As used herein, the term "direction C1" refers to a clockwise direction when the driving force transmission apparatus 1 is viewed from the output shaft 26 toward the input shaft 25 (see FIG. 3), and the term "direction C2" refers to a counterclockwise direction when the driving force transmission apparatus 1 is viewed from the output shaft 26 toward the input shaft 25 (see FIG. 3).

The input shaft 25 includes a shaft portion 30 and an inner ring 31. The shaft portion 30 extends in the axial direction X. The inner ring 31 is coaxially coupled to an end of the shaft portion 30 facing in the second direction X2. The output shaft 26 includes a shaft portion 32 and an outer ring 33. The shaft portion 32 extends in the axial direction X. The outer ring 33 is coaxially coupled to an end of the shaft portion 32 facing in the first direction X1. The driving force transmission apparatus 1 includes a two-way clutch 40 and an electromagnetic clutch 50. The two-way clutch 40 turns on and off transmission of a rotational force from the inner ring 31 to the outer ring 33. The electromagnetic clutch 50 causes the two-way clutch 40 to operate. The driving force transmission apparatus 1 further includes a housing 60 that houses the inner ring 31, the outer ring 33, the two-way clutch 40, and the electromagnetic clutch 50.

The housing 60 has a cylindrical shape. An end of the housing 60 facing in the second direction X2 is provided with a bushing 61. A first rolling bearing 71 is disposed between the inner peripheral surface of the bushing 61 and the outer peripheral surface of the shaft portion 32 of the output shaft 26. The output shaft 26 is supported by the first rolling bearing 71 so that the output shaft 26 is rotatable relative to the housing 60 and immovable in the axial direction X. The inner ring 31 is made of a steel material, for example. The outer ring 33 has a cylindrical shape, with the outer ring 33 closed at its one end facing in the second direction X2. The outer ring 33 is made of a steel material. The outer ring 33 is provided at its bottom with an annular step 38 that reduces the bore diameter of the outer ring 33. A second rolling bearing 72 is disposed between the inner periphery of the annular step 38 of the outer ring 33 and the outer periphery of an end of the inner ring 31 facing in the second direction X2. Thus, the inner ring 31 is supported by the second rolling bearing 72 so that the inner ring 31 is rotatable relative to the outer ring 33 and immovable in the axial direction X.

Referring now to FIG. 3, the inner ring 31 includes an outer peripheral portion 34. The outer ring 33 includes a cylindrical inner peripheral portion 35 facing the outer peripheral portion 34 in the radial direction R. The outer peripheral portion 34 includes a plurality of cam surfaces 37 facing the inner peripheral portion 35 in the radial direction R. In the present embodiment, the cam surfaces 37 are three in number. The cam surfaces 37 include: pairs of inclined surfaces 37a; and elastic body supporting surfaces 37b. The inclined surfaces 37a of each pair are inclined in opposite directions with respect to the circumferential direction C. Each elastic body supporting surface 37b is provided between the inclined surfaces 37a of the associated pair. Each elastic body supporting surface 37b is flat and perpendicular to the radial direction R. The outer peripheral portion 34 further includes curved surfaces so that the cam surfaces 37 are continuous with each other through the curved surfaces.

A space 36 is defined between the outer peripheral portion 34 and the inner peripheral portion 35. The space 36 includes: first sub-spaces 36a that are relatively large; and second sub-spaces 36b that are relatively small. The first sub-spaces 36a and the second sub-spaces 36b are located alternately in the circumferential direction C. The boundaries between the first sub-spaces 36a and the second sub-spaces 36b are provided in the vicinity of the inclined surfaces 37a. The space 36 is gradually reduced in size in the radial direction R from the first sub-spaces 36a to the second sub-spaces 36b. In the present embodiment, the first sub-spaces 36a arranged in the circumferential direction C are three in number, and the second sub-spaces 36b arranged in the circumferential direction C are also three in number.

Figure 4:
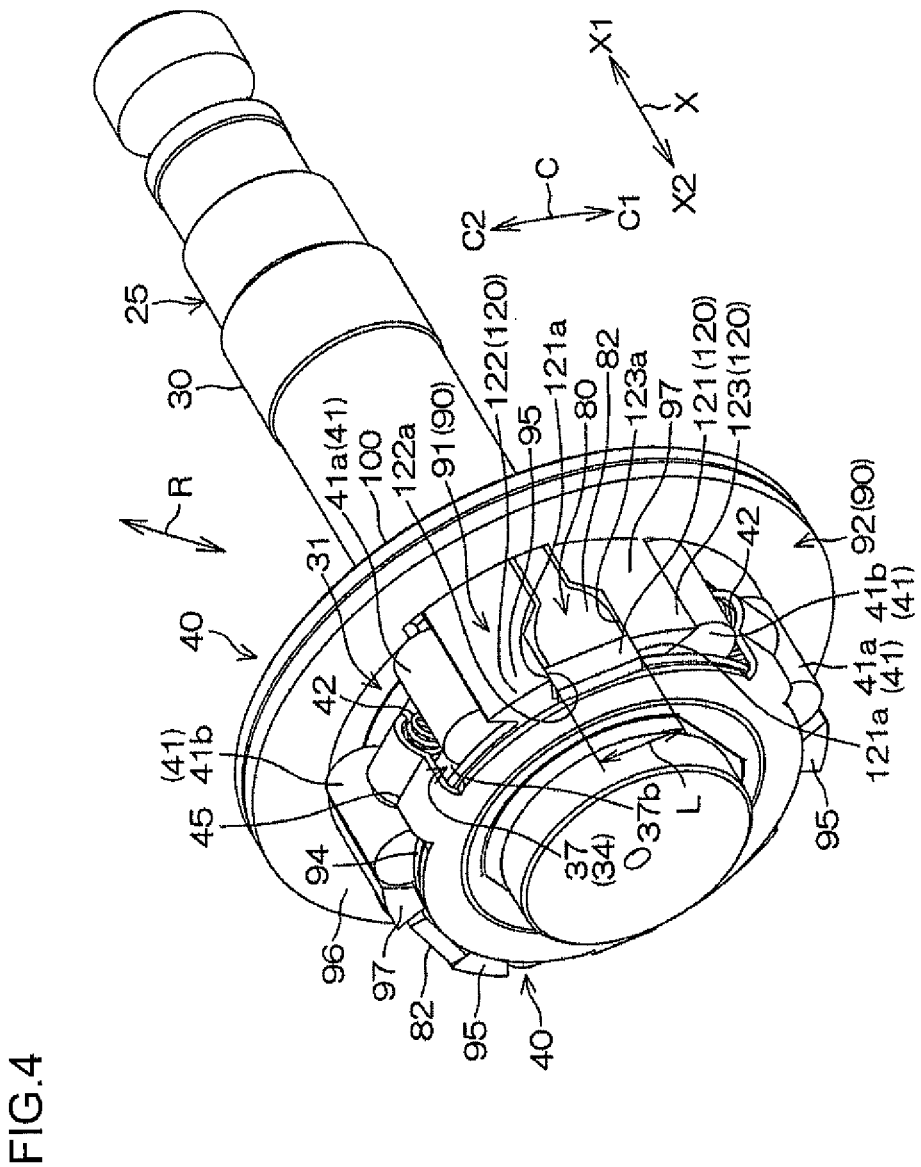
FIG. 4 is a perspective view of a two-way clutch of the driving force transmission apparatus.
Figure 5:
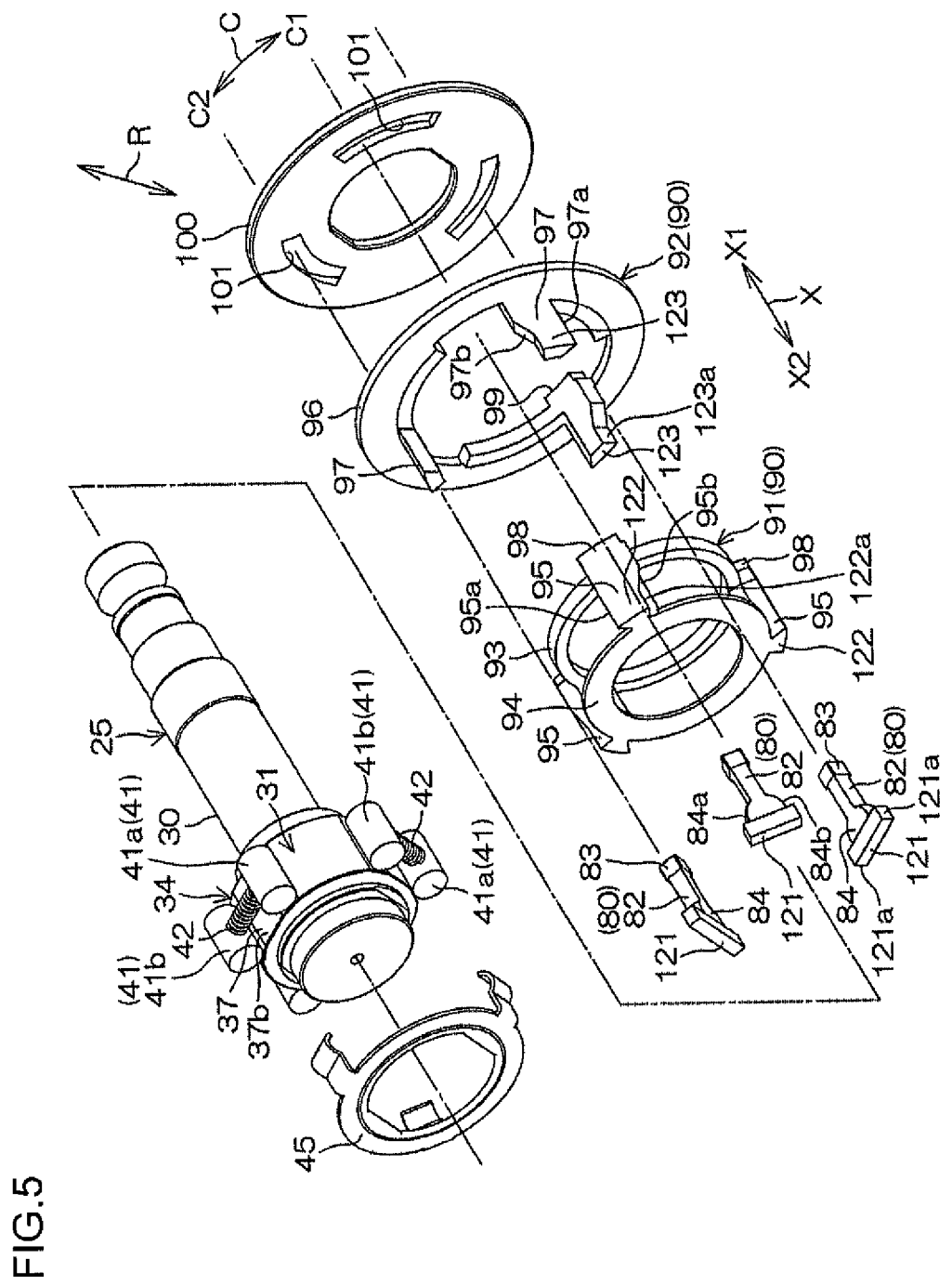
FIG. 5 is an exploded perspective view of the two-way clutch.

As illustrated in FIGS. 2 and 3, the driving force transmission apparatus 1 includes: the outer peripheral portion 34 on the input shaft 25; and the inner peripheral portion 35 on the output shaft 26. The driving force transmission apparatus 1, however, is not limited to this configuration. The driving force transmission apparatus 1 may be used in a wide range of applications where a first shaft and a second shaft are coaxial with each other. FIG. 4 is a perspective view of the two-way clutch 40 of the driving force transmission apparatus 1. FIG. 5 is an exploded perspective view of the two-way clutch 40.

As illustrated in FIGS. 3 and 4, the two-way clutch 40 includes pairs of rolling elements 41. The pairs of rolling elements 41 are disposed in the space 36. Each rolling element 41 is, for example, a roller that extends in the axial direction X. Each pair of rolling elements 41 includes a first rolling element 41a and a second rolling element 41b. The first rolling element 41a and the second rolling element 41b included in each pair of rolling elements 41 are spaced from each other in the circumferential direction C. Referring now to FIG. 4, the two-way clutch 40 includes three pairs of the first and second rolling elements 41a and 41b (see also FIG. 3). Each second rolling element 41b is located in the direction C2 with respect to the associated first rolling element 41a.

In the present embodiment, the two-way clutch 40 is provided with three pairs of rolling elements 41. In one example, the two-way clutch 40 may be provided with at least one pair of rolling elements 41. In another example, the two-way clutch 40 may be provided with two or four pairs of rolling elements 41. Suppose that the two-way clutch 40 is provided with one or two pair(s) of rolling elements 41. In this case, in order to maintain the positions of the inner ring 31 and the outer ring 33 in the radial direction R, roller(s), for example, may be provided so that the roller(s) spin(s) between the outer peripheral portion 34 on the inner ring 31 and the inner peripheral portion 35 on the outer ring 33.

Referring to FIG. 3, the two-way clutch 40 further includes elastic bodies 42 each disposed between the rolling elements 41 of the associated pair. Each elastic body 42 is disposed in the space 36. Each elastic body 42 is, for example, a compression coil spring (see FIG. 4). Alternatively, each elastic body 42 may be any other type of spring, such as a plate spring, or a rubber material. Each elastic body 42 elastically urges the associated first and second rolling elements 41a and 41b away from each other in the circumferential direction C. An end of each elastic body 42 facing in the direction C1 urges the associated first rolling element 41a in the direction C1. An end of each elastic body 42 facing in the direction C2 urges the associated second rolling element 41b in the direction C2. Each elastic body 42 is supported by the associated elastic body supporting surface 37b. The elastic bodies 42 are collectively supported by an elastic body cage 45. The elastic body cage 45 is fitted to the inner ring 31, thus retaining the elastic bodies 42 on the inner ring 31 (see also FIG. 4).

Referring now to FIG. 2, the two-way clutch 40 further includes a portion of a switching member 80 disposed between the pairs of rolling elements 41. The switching member 80 includes: a ring body 81 concentric with the inner ring 31; and a plurality of separators 82 (see also FIG. 5). In this example, the separators 82 are three in number. Each separator 82 protrudes in the second direction X2 from the ring body 81. The switching member 80 is displaceable in the first direction X1 and the second direction X2. Referring to FIG. 5, each separator 82 extends in the axial direction X. Each separator 82 includes: a rectangular end 83 facing in the first direction X1; and a wedge portion 84. Each wedge portion 84 is provided on an end of the associated separator 82 facing in the second direction X2. Each wedge portion 84 increases in width as it extends in the second direction X2. Each wedge portion 84 includes a first sliding contact surface 84a and a second sliding contact surface 84b. Each first sliding contact surface 84a is provided on a lateral face of the associated wedge portion 84 facing in the direction C2. Each second sliding contact surface 84b is provided on a lateral surface of the wedge portion 84 facing in the direction C1.

Each first sliding contact surface 84a is an inclined surface that extends in the direction C1 as it extends in the first direction X1. In this embodiment, each first sliding contact surface 84a has a curved shape that resembles a portion of a sphere. Each second sliding contact surface 84b is an inclined surface that extends in the direction C2 as it extends in the first direction X1. In this embodiment, each second sliding contact surface 84b has a curved shape that resembles a portion of a sphere. Alternatively, each of the first sliding contact surfaces 84a and the second sliding contact surfaces 84b may be a flat inclined surface.

Referring to FIG. 2, the ring body 81 is, for example, an armature. The ring body 81 is not only rotatable relative to the housing 60 and the shaft portion 30 of the input shaft 25 but also movable relative to the housing 60 and the shaft portion 30 of the input shaft 25 in the axial direction X. The ends 83 of the separators 82, each facing in the first direction X1, are fixed to the ring body 81 of the switching member 80. Referring to FIG. 4, the driving force transmission apparatus 1 further includes a retainer 90. The retainer 90 retains the pairs of rolling elements 41 and the elastic bodies 42. The retainer 90 includes a pair of retaining members, i.e., an inner retaining member 91 and an outer retaining member 92. The inner retaining member 91 and the outer retaining member 92 are rotatable relative to each other.

Although the pairs of rolling elements 41 are retained by the retainer 90 in the present embodiment, the retainer 90 may be omitted. In such a case, the pairs of rolling elements 41 may be retained by the switching member 80. Referring to FIG. 5, the inner retaining member 91 includes: a first annular portion 93 having a flat shape; a second annular portion 94; and a plurality of connectors 95. In this example, the connectors 95 are three in number. The second annular portion 94 is coaxial with the first annular portion 93 and disposed in the second direction X2 with respect to the first annular portion 93. The connectors 95 connect the first annular portion 93 and the second annular portion 94 to each other. Referring to FIG. 2, the inner retaining member 91 is fitted to the inner ring 31 so that the inner retaining member 91 is rotatable relative to the inner ring 31. The second annular portion 94 is in abutment with an end face of the inner ring 31 facing in the second direction X2.

Referring to FIG. 5, each connector 95 has a columnar shape extending in the axial direction X. Each connector 95 is disposed between the associated separator 82 and the associated rolling element 41 (see FIG. 4). Each connector 95 includes a first restricting projection 98 projecting outward (i.e., in the first direction X1) from the second annular portion 94. A lateral surface of each connector 95 facing in the direction C2 is provided with a first abutment surface 95a that is brought into abutment with (or pressed against) the associated first rolling element 41a.

A lateral surface of each connector 95 facing in the direction C1 is provided with a first sliding contact surface 95b that comes into sliding contact with the associated separator 82 of the switching member 80. Each first sliding contact surface 95b is an inclined surface that extends in the direction C1 as it extends in the first direction X1. The outer retaining member 92 includes a third annular portion 96 and a plurality of protrusions 97. Each protrusion 97 protrudes in the second direction X2 from the inner periphery of the third annular portion 96. The third annular portion 96 is disposed to surround the outer periphery of the first annular portion 93 (see FIG. 2). The number of protrusions 97 is equal to the number of pairs of rolling elements 41. In this example, the protrusions 97 are three in number. The protrusions 97 are spaced uniformly from each other in the circumferential direction C. Each protrusion 97 is disposed between the associated separator 82 and the associated second rolling element 41b.

A lateral surface of each protrusion 97 facing in the direction C1 is provided with a second abutment surface 97a that is brought into abutment with (or pressed against) the associated second rolling element 41b. A lateral surface of each protrusion 97 facing in the direction C2 is provided with a second sliding contact surface 97b that comes into sliding contact with the associated separator 82. Each second sliding contact surface 97b is an inclined surface that extends in the direction C2 as it extends in the first direction X1. The third annular portion 96 is provided with second restricting projections 99 projecting in the first direction X1 from portions of the inner periphery of the third annular portion 96 where the projections 97 project. Note that only one of the second restricting projections 99 is illustrated in FIG. 5.

As illustrated in FIG. 3, the inner retaining member 91 and the outer retaining member 92 are assembled to each other so that the connectors 95 and the protrusions 97 are arranged alternately in the circumferential direction C. Each pair of rolling elements 41 is disposed between the associated connector 95 and the protrusion 97 spaced from this connector 95 in the direction C2. Each separator 82 is interposed between the associated connector 95 and the protrusion 97 spaced from this connector 95 in the direction C1 (see FIG. 4).

As illustrated in FIG. 2, the first annular portion 93 of the inner retaining member 91 and the third annular portion 96 of the outer retaining member 92 restrict movement of each of the rolling elements 41a and 41b in the first direction X1. The second annular portion 94 of the inner retaining member 91 restricts movement of each of the rolling elements 41a and 41b in the second direction X2. As illustrated in FIGS. 2 and 5, the driving force transmission apparatus 1 further includes a flat annular back plate 100. With the back plate 100 fitted to the shaft portion 30 of the input shaft 25, the back plate 100 is fixed to the shaft portion 30. The back plate 100 is made of a steel material, for example. A surface of the back plate 100 facing in the second direction X2 is in sliding contact with the first annular portion 93 and the third annular portion 96. The back plate 100 is provided with a plurality of elongated holes 101 passing through the back plate 100 in the axial direction X. In this example, the elongated holes 101 are three in number. The elongated holes 101 are spaced uniformly from each other in the circumferential direction C. The first restricting projections 98, the second restricting projections 99, and the separators 82 are each inserted into the associated elongated hole 101 (see FIG. 6 discussed below).

As illustrated in FIG. 2, the electromagnetic clutch 50 includes the ring body 81 of the switching member 80 previously described, an annular rotor 51, and an electromagnet 52. The rotor 51 faces the ring body 81 in the second direction X2. The electromagnet 52 is disposed in the first direction X1 with respect to the rotor 51. With the rotor 51 fitted to the shaft portion 30 of the input shaft 25, the rotor 51 is fixed to the shaft portion 30. The electromagnet 52 includes: an annular magnetic coil 52a; and an annular core 52b supporting the magnetic coil 52a. The core 52b is fixed to a lid 62 that is secured to an end of the housing 60 having an opening therethrough. A third rolling bearing 73 is disposed between the shaft portion 30 of the input shaft 25 and a cylindrical bearing support 63 extending in the first direction X1 from the lid 62. An end of the shaft portion 30 of the input shaft 25, facing in the first direction X1, is supported by the third rolling bearing 73 and the lid 62 so that the shaft portion 30 is rotatable relative to the housing 60 and immovable relative to the housing 60 in the axial direction X.

Referring to FIG. 2, the driving force transmission apparatus 1 further includes a switching member assist 110 to aid the switching member 80 in carrying out its operations. The switching member assist 110 includes, for example, a plurality of urging members 111 each disposed between the ring body 81 and the rotor 51. Each urging member 111 is, for example, a coil spring expandable and contractible in the axial direction X. The urging members 111 are spaced uniformly from each other in the circumferential direction C. The urging members 111 urge the ring body 81 of the switching member 80 toward the outer ring 33 in the second direction X2.

Referring to FIG. 4, the switching member 80 further includes a restrictor 120 to restrict the positions of the inner retaining member 91 and the outer retaining member 92 in the circumferential direction C. The restrictor 120 includes restricting members 121, first restricted portions 122, and second restricted portions 123. Each restricting member 121 is provided on the associated separator 82. Each first restricted portion 122 is provided on an end of the associated connector 95 of the inner retaining member 91 facing in the second direction X2. Each second restricted portion 123 is provided on an end of the associated protrusion 97 of the outer retaining member 92 facing in the second direction X2.

Each restricting member 121 may be integral with the associated separator 82, for example. Each restricting member 121 is larger than the associated separator 82 in the circumferential direction C. Each restricting member 121 includes end faces 121a each facing in the circumferential direction C and having a flat shape in the axial direction X. The end faces 121a have a length L therebetween in the circumferential direction C. The length L is constant in the axial direction X. In the present embodiment, each restricting member 121 is coupled to an end of the associated separator 82 facing in the second direction X2. Alternatively, each separator 82 may pass through the associated restricting member 121 so that the end of the separator 82, facing in the second direction X2, protrudes from the associated restricting member 121 in the second direction X2.

Each first restricted portion 122 and each second restricted portion 123 are located opposite to each other, with the associated restricting member 121 interposed therebetween in the circumferential direction C. Each first restricted portion 122 includes a surface 122a facing a corresponding one of the end faces 121a of the associated restricting member 121 in the circumferential direction C. Each surface 122a is flat in the axial direction X. Each second restricted portion 123 includes a surface 123a facing a corresponding one of the end faces 121a of the associated restricting member 121 in the circumferential direction C. Each surface 123a is flat in the axial direction X.

Figure 6:
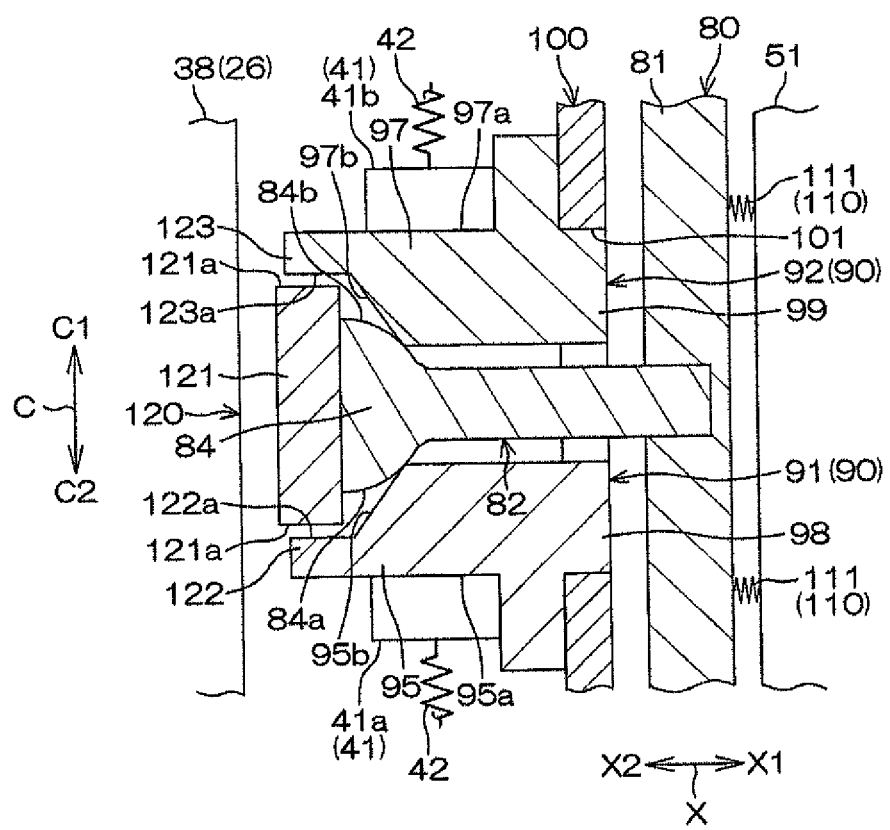
FIG. 6 is a cross-sectional view of the driving force transmission apparatus taken along the line VI-VI in FIG. 3, schematically illustrating the driving force transmission apparatus in an off state.
Figure 7:
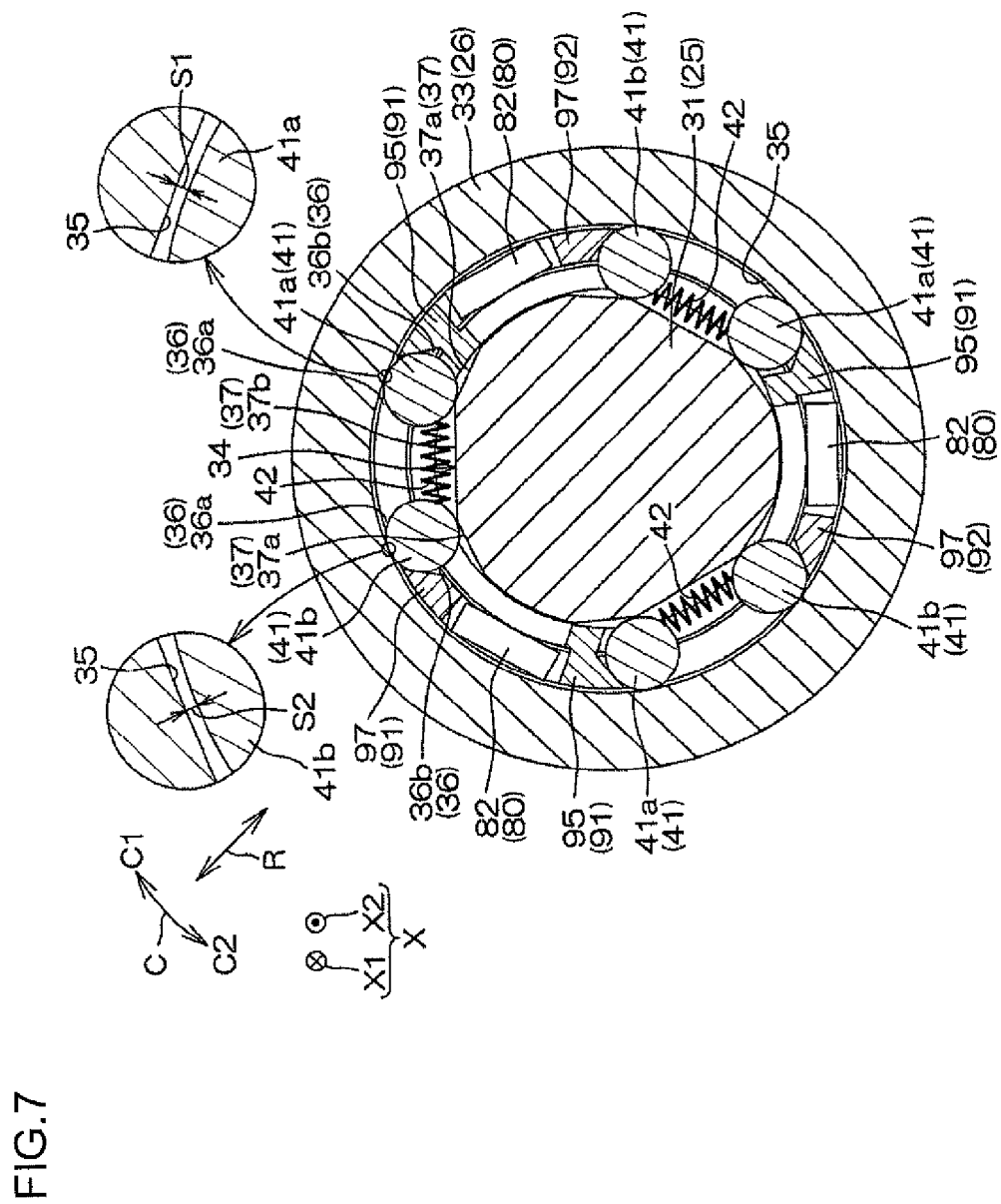
FIG. 7 is a cross-sectional view equivalent to FIG. 3 but schematically illustrating the driving force transmission apparatus in the off state.

The following description discusses how the separators 82 function to perform a switching operation. FIG. 6 is a cross-sectional view of the driving force transmission apparatus 1 taken along the line VI-VI in FIG. 3, schematically illustrating the driving force transmission apparatus 1 in the off state. FIG. 7 is a cross-sectional view equivalent to FIG. 3 but schematically illustrating the driving force transmission apparatus 1 in the off state. Each separator 82 is movable between a first position that is the farthest possible position in the first direction X1 and a second position that is the farthest possible position in the second direction X2. FIG. 6 illustrates the separator 82 located at the first position.

Figure 8:
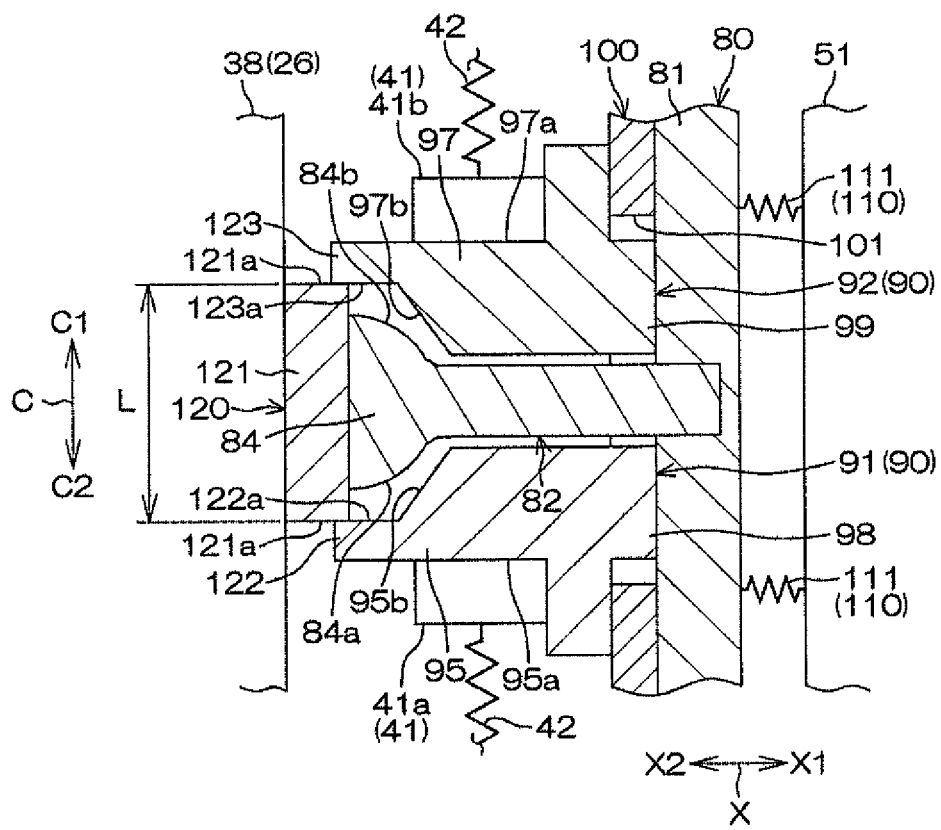
FIG. 8 is a cross-sectional view equivalent to FIG. 6 but schematically illustrating the driving force transmission apparatus in an on state.

FIG. 8 (which will be discussed below) illustrates the separator 82 located at the second position. When each separator 82 is located at the first position, the driving force transmission apparatus 1 is in the off state. When each separator 82 is located at the second position, the driving force transmission apparatus 1 is in the on state.

Referring now to FIG. 2, energizing the electromagnet 52 causes the electromagnet 52 to attract the ring body 81 of the switching member 80. Thus, the separators 82 coupled to the ring body 81 are attracted in the first direction X1. This attraction displaces the separators 82 in the first direction X1, so that each separator 82 is located at the first position. As previously described, the separator 82 located at the first position is illustrated in FIG. 6. As illustrated in FIGS. 6 and 7, the displacement of each separator 82 to the first position (which is illustrated in FIG. 6) in the first direction X1 causes the first sliding contact surfaces 84a of the separators 82 to slide along the first sliding contact surfaces 95b of the connectors 95, with the first sliding contact surfaces 84a pressing the connectors 95 in the direction C2. This moves the connectors 95 in the direction C2. Concurrently with this movement, the second sliding contact surfaces 84b of the separators 82 slide along the second sliding contact surfaces 97b of the protrusions 97, with the second sliding contact surfaces 84b pressing the protrusions 97 in the direction C1. Thus, the protrusions 97 move in the direction C1. As a result, the inner retaining member 91 rotates relative to the separators 82 in the direction C2, and the outer retaining member 92 rotates relative to the separators 82 in the direction C1. In this case, the first restricting projections 98 abut against ends of the elongated holes 101 of the back plate 100 facing in the direction C2, thus restricting rotation of the connectors 95. The second restricting projections 99 abut against ends of the elongated holes 101 facing in the direction C1, thus restricting rotation of the protrusions 97.

The rotation of the inner retaining member 91 relative to the separators 82 in the direction C2 moves each connector 95 in the direction C2. Thus, the first abutment surface 95a of each connector 95 presses the associated first rolling element 41a in the direction C2. This pressing causes each first rolling element 41a to move in the direction C2 against the elastic urging force from the associated elastic body 42. Consequently, as illustrated in FIG. 7, each first rolling element 41a moves from the second sub-space 36b to the first sub-space 36a, forming a clearance S1 between each first rolling element 41a and the inner peripheral portion 35 of the outer ring 33. In other words, each first rolling element 41a moves out of engagement with the inner peripheral portion 35 of the outer ring 33.

Referring to FIG. 6, the rotation of the outer retaining member 92 relative to the separators 82 in the direction C1 moves each protrusion 97 in the direction C1. Thus, the second abutment surface 97a of each protrusion 97 presses the associated second rolling element 41b in the direction C1. This pressing causes each second rolling element 41b to move in the direction C1 against the elastic urging force from the associated elastic body 42. Consequently, as illustrated in FIG. 7, each second rolling element 41b moves from the second sub-space 36b to the first sub-space 36a, forming a clearance S2 between each second rolling element 41b and the inner peripheral portion 35 of the outer ring 33. In other words, each second rolling element 41b moves out of engagement with the inner peripheral portion 35 of the outer ring 33.

The separators 82 cause the rolling elements 41 of each pair to move to the associated first sub-space 36a and come close to each other in the circumferential direction C against the elastic urging force from the associated elastic body 42. Thus, the rolling elements 41 of each pair move out of engagement with the inner peripheral portion 35 and form the clearances S1 and S2 with the inner peripheral portion 35 in the space 36. As a result, the driving force transmission apparatus 1 enters the off state. In an alternative embodiment, the rolling elements 41 of each pair may move out of engagement with the inner ring 31 and form the clearances S1 and S2 with the outer peripheral portion 34, so that the driving force transmission apparatus 1 enters the off state.

Figure 9A:
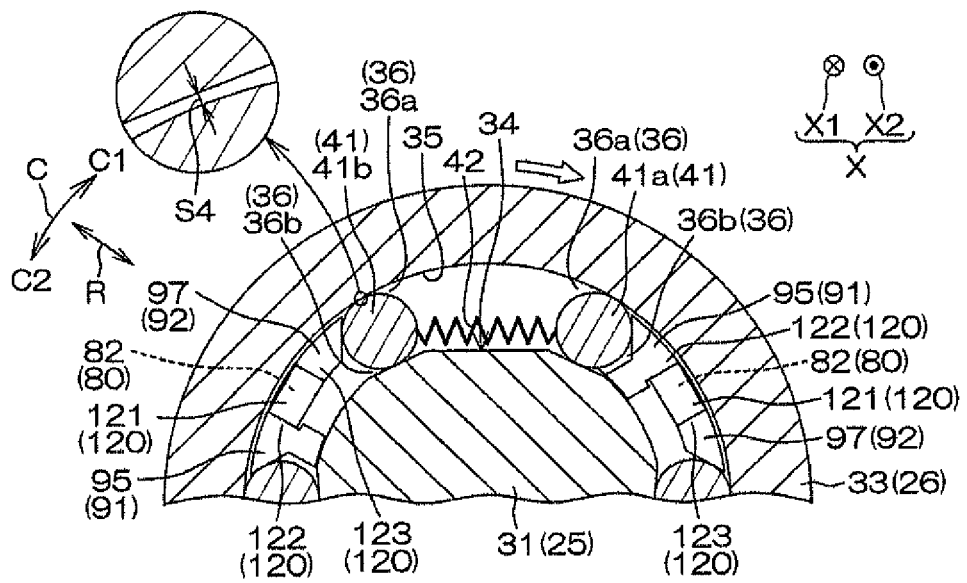
FIG. 9A is a schematic diagram illustrating the driving force transmission apparatus in the on state, with an output shaft rotated relative to an input shaft in a direction C1.
Figure 9B:
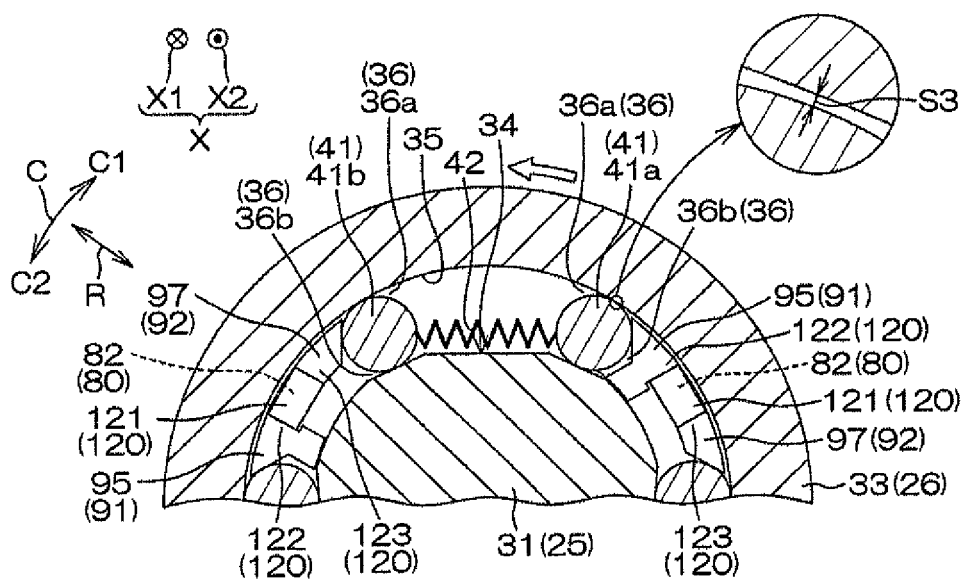
FIG. 9B is a schematic diagram illustrating the driving force transmission apparatus in the on state, with the output shaft rotated relative to the input shaft in a direction C2.

FIG. 8 is a cross-sectional view equivalent to FIG. 6 but schematically illustrating the driving force transmission apparatus 1 in the on state. FIG. 9A is a schematic diagram illustrating the driving force transmission apparatus 1 in the on state, with the output shaft 26 rotated relative to the input shaft 25 in the direction C1. FIG. 9B is a schematic diagram illustrating the driving force transmission apparatus 1 in the on state, with the output shaft 26 rotated relative to the input shaft 25 in the direction C2. De-energizing the electromagnet 52 stops the electromagnet 52 from attracting the ring body 81 of the switching member 80 (see FIG. 2). Referring to FIGS. 8 and 9, once the electromagnet 52 stops attracting the ring body 81, the separators 82 cease to press the connectors 95 and the protrusions 97, so that each connector 95 and each protrusion 97 cease to press the rolling elements 41 of the associated pair. Thus, the elastic urging force from each elastic body 42 moves the rolling elements 41 of the associated pair away from each other. In this case, each first rolling element 41a moves in the direction C1, and each second rolling element 41b moves in the direction C2. Consequently, the rolling elements 41 of each pair move to the second sub-spaces 36b, so that the driving force transmission apparatus 1 enters the on state.

Upon receiving the elastic urging force from the elastic bodies 42 through the associated rolling elements 41, the first sliding contact surface 84a of each separator 82 moves away from the associated first sliding contact surface 95b in the second direction X2, and the second sliding contact surface 84b of each separator 82 moves away from the associated second sliding contact surface 97b in the second direction X2. As a result, each separator 82 is displaced in the second direction X2 and thus returned to the second position (which is illustrated in FIG. 8).

With each separator 82 located at the second position, the first sliding contact surface 84a of each separator 82 is spaced from the first sliding contact surface 95b of the associated connector 95 of the inner retaining member 91 in the axial direction X. In this case, each first sliding contact surface 84a faces the associated first sliding contact surface 95b in the first direction X1. With each separator 82 located at the second position, the second sliding contact surface 84b of each separator 82 is spaced from the second sliding contact surface 97b of the associated protrusion 97 of the outer retaining member 92 in the axial direction X. In this case, each second sliding contact surface 84b faces the associated second sliding contact surface 97b in the first direction X1.

Operating the steering member 4 (see FIG. 1) during the on state of the driving force transmission apparatus 1 causes the input shaft 25 and the output shaft 26 to rotate substantially together. The input shaft 25 and the output shaft 26, however, rotate relative to each other until one of the rolling elements 41 of each pair comes into engagement with the outer peripheral portion 34 and the inner peripheral portion 35. As illustrated in FIG. 9A, the rotation of the output shaft 26 relative to the input shaft 25 in the direction C1, for example, moves each second rolling element 41b, which is upstream of the associated first rolling element 41a in the direction of rotation (or located in the direction C2 with respect to the associated first rolling element 41a), so that a clearance S4 is formed between each second rolling element 41b and the outer peripheral portion 34 or the inner peripheral portion 35. In the present embodiment, the clearance S4 is formed between each second rolling element 41b and the inner peripheral portion 35. Each second rolling element 41b moves the associated first rolling element 41a, which is downstream of the associated second rolling element 41b (or located in the direction C1 with respect to the associated second rolling element 41b), through the associated elastic body 42 so that each first rolling element 41a comes into zero clearance engagement with the outer peripheral portion 34 and the inner peripheral portion 35. This enables rotational force transmission between the input shaft 25 and the output shaft 26.

In contrast, as illustrated in FIG. 9B, the rotation of the output shaft 26 relative to the input shaft 25 in the direction C2 moves each first rolling element 41a, which is upstream of the associated second rolling element 41b in the direction of rotation (or located in the direction C1 with respect to the associated second rolling element 41b), so that a clearance S3 is formed between each first rolling element 41a and the outer peripheral portion 34 or the inner peripheral portion 35. In the present embodiment, the clearance S3 is formed between each first rolling element 41a and the inner peripheral portion 35. Each first rolling element 41a moves the associated second rolling element 41b, which is downstream of the associated first rolling element 41a (or located in the direction C2 with respect to the associated first rolling element 41a), through the associated elastic body 42 so that each second rolling element 41b comes into zero clearance engagement with the outer peripheral portion 34 and the inner peripheral portion 35. This enables rotational force transmission between the input shaft 25 and the output shaft 26.

Referring now to FIG. 8, with each separator 82 located at the second position, each first restricted portion 122 coupled to the associated connector 95 and each second restricted portion 123 coupled to the associated protrusion 97 receive the elastic urging forces from the elastic bodies 42 through the rolling elements 41. Thus, each first restricted portion 122 and each second restricted portion 123 are pressed against the restricting member 121 coupled to the associated separator 82. This keeps the surface 122a of each first restricted portion 122 and the surface 123a of each second restricted portion 123 in contact with the end faces 121a of the associated restricting member 121.

The length L is constant in the axial direction X. Thus, with each separator 82 located at the second position, the distance between each first restricted portion 122 and the associated second restricted portion 123 is also constant, and the distance between each connector 95 and the associated protrusion 97 in the circumferential direction C is also constant. This allows the restrictor 120 to restrict the relative positions of the inner retaining member 91 and the outer retaining member 92 in the circumferential direction C. Such restriction restricts a spacing D between each first rolling element 41a retained by the inner retaining member 91 and each second rolling element 41b retained by the outer retaining member 92 (see FIG. 3).

With each separator 82 displaced in the second direction X2, each separator 82 is rotatable with rotation of the output shaft 26 (or follows rotation of the output shaft 26). With each separator 82 displaced in the second direction X2 and located at the second position, the urging members 111 urge the ring body 81, which is coupled to the separators 82, in the second direction X2. Thus, each restricting member 121 coupled to the end of the associated separator 82 facing in the second direction X2 is pressed against the annular step 38 of the outer ring 33. This enables the urging members 111 of the switching member assist 110 to aid each separator 82 of the switching member 80 in rotating with rotation of the output shaft 26.

Figure 10A:
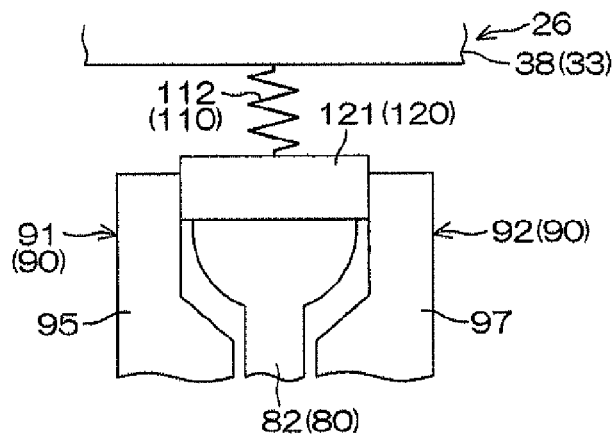
FIG. 10A is a schematic diagram illustrating a switching member assist according to a first variation and its adjacent components.
Figure 10B:
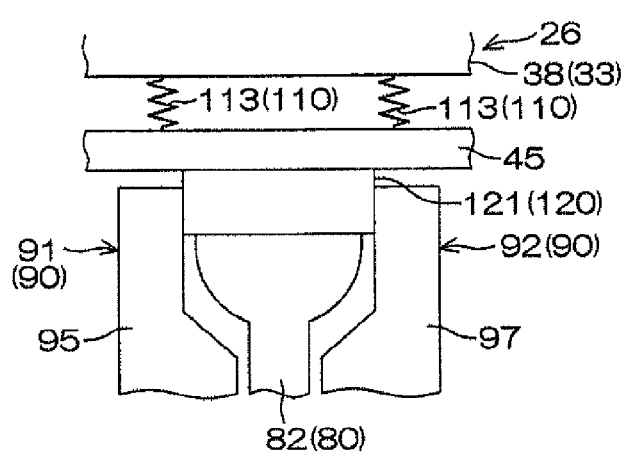
FIG. 10B is a schematic diagram illustrating the switching member assist according to a second variation and its adjacent components.
Figure 10C:
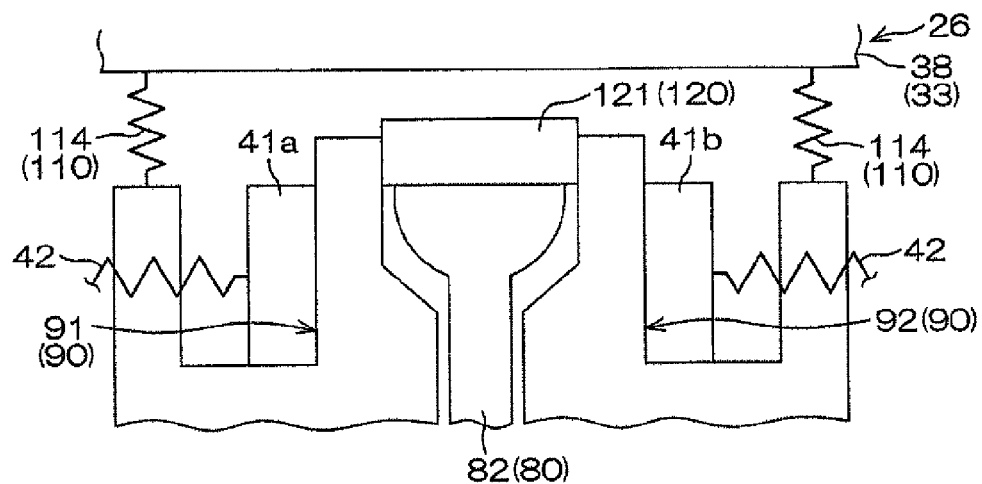
FIG. 10C is a schematic diagram illustrating the switching member assist according to a third variation and its adjacent components.

FIGS. 10A, 10B, and 10C are schematic diagrams each illustrating the switching member assist 110 and its adjacent components. FIG. 10A illustrates the switching member assist 110 according to a first variation. FIG. 10B illustrates the switching member assist 110 according to a second variation. FIG. 10C illustrates the switching member assist 110 according to a third variation. As illustrated in FIG. 10A, the switching member assist 110 may include an urging member 112 disposed between the annular step 38 and each restricting member 121 of the restrictor 120. Each urging member 112 is compressed between the associated restricting member 121 and the annular step 38. This compression produces friction between each urging member 112 and the associated restricting member 121. Consequently, each separator 82 coupled to the associated restricting member 121 is rotatable with rotation of the output shaft 26.

As illustrated in FIG. 10B, the switching member assist 110 may include urging members 113 disposed between the elastic body cage 45 and the annular step 38. Each restricting member 121 may be integral with the elastic body cage 45. The urging members 113 are compressed between the elastic body cage 45 and the annular step 38. This compression produces friction between the urging members 113 and the elastic body cage 45. Consequently, each separator 82 coupled to the elastic body cage 45 through the associated restricting member 121 is rotatable with rotation of the output shaft 26.

As illustrated in FIG. 10C, the switching member assist 110 may include urging members 114 disposed between the annular step 38 of the outer ring 33 and the inner retaining member 91 or the outer retaining member 92. The urging members 114 are compressed between the annular step 38 and the inner retaining member 91 or the outer retaining member 92. This compression produces friction between the urging members 114 and the inner retaining member 91 or the outer retaining member 92. Consequently, each separator 82 that rotates together with the inner retaining member 91 or the outer retaining member 92 is rotatable with rotation of the output shaft 26.

Ring-shaped spacers (not illustrated) may be interposed between the restricting members 121 of the restrictor 120 and the annular step 38 of the outer ring 33. In such an embodiment, the spacers may be rotatably attached to the inner ring 31, for example. In the present embodiment, with the driving force transmission apparatus 1 in the on state, one of the rolling elements 41a and 41b of each pair, which is downstream of the other one of the rolling elements 41a and 41b in the direction of rotation of the input shaft 25 and the output shaft 26 (or located in the direction C1 or C2 with respect to the other one of the rolling elements 41a and 41b), is in zero clearance engagement with the outer peripheral portion 34 and inner peripheral portion 35. During the on state, the clearance S3 or S4 is formed between the outer peripheral portion 34 or the inner peripheral portion 35 and one of the rolling elements 41a and 41b of each pair, which is upstream of the other one of the rolling elements 41a and 41b in the direction of rotation. Thus, in whichever direction the input shaft 25 and the output shaft 26 rotate, the clearance S3 or S4 is formed between the outer peripheral portion 34 or the inner peripheral portion 35 and one of the rolling elements 41a and 41b of each pair, which is upstream of the other one of the rolling elements 41a and 41b in the direction of rotation. This means that during the on state, backlash present in the circumferential direction C is created between each pair of rolling elements 41 and the outer ring 33 or the inner ring 31. Such backlash facilitates disengagement of the rolling elements 41a and 41b from the outer peripheral portion 34 and the inner peripheral portion 35 when the separators 82 of the switching member 80 switch the driving force transmission apparatus 1 from the on state to the off state. Accordingly, the driving force transmission apparatus 1 is smoothly switchable between the on state in which a rotational force is transmitted between the input shaft 25 and the output shaft 26 and the off state in which no rotational force is transmitted between the input shaft 25 and the output shaft 26.

The configuration thus described reduces magnetic force to be produced by the electromagnetic clutch 50. Thus, unlike a configuration in which both of the rolling elements 41 of each pair are in engagement with the outer peripheral portion 34 and the inner peripheral portion 35 during the on state, the configuration of the invention enables the use of the electromagnetic clutch 50 having a small size. In the present embodiment, the space 36 includes at least three first sub-spaces 36a and at least three second sub-spaces 36b arranged alternately in the circumferential direction C so that the pairs of rolling elements 41 are each disposed in associated one(s) of the first and second sub-spaces 36a and 36b. Consequently, during the on state, downstream ones of the rolling elements 41 in the direction of rotation enable a rotational force to be transmitted between the inner ring 31 and the outer ring 33 uniformly in the circumferential direction C.

With rotation of the output shaft 26, the separators 82 of the switching member 80 move in the direction of rotation of the output shaft 26. Thus, upstream ones of the rolling elements 41 (e.g., the first rolling elements 41a) and the elastic bodies 42 cause movement of downstream ones of the rolling elements 41 (e.g., the second rolling elements 41b). This movement reliably forms clearances between the upstream ones of the rolling elements 41 and the outer peripheral portion 34 or the inner peripheral portion 35. As a result, the downstream ones of the rolling elements 41 (e.g., the second rolling elements 41b) reliably come into engagement with the outer peripheral portion 34 and the inner peripheral portion 35.

The switching member assist 110 causes the switching member 80 to reliably rotate with rotation of the output shaft 26. Thus, when the direction of rotation is changed between the direction C1 and the direction C2, the rolling elements 41 to be brought into engagement with the inner peripheral portion 35 and the outer peripheral portion 34 are quickly changed from the first rolling elements 41a to the second rolling elements 41b or from the second rolling elements 41b to the first rolling elements 41a. During the off state, the switching member 80 is displaced in the first direction X1 and thus spaced from the outer ring 33 in the first direction X1. This prevents unnecessary load from being applied to the input shaft 25 during the off state.

As in the configuration illustrated in FIGS. 6 to 9B, the urging members 111 are disposed between the ring body 81 and the rotor 51. Friction between some components (e.g., between the switching member 80 and the outer ring 33) is necessary, while friction between other components (e.g., between the inner retaining member 91 and the back plate 100 and between the outer retaining member 92 and the back plate 100) is unnecessary. The urging members 111 in this configuration reduce or eliminate friction between the components for which friction is unnecessary. The rolling elements 41 are retained by the retainer 90, thus stabilizing the positions of the rolling elements 41 in the space 36.

The restrictor 120 restricts the spacing between the inner retaining member 91 and the outer retaining member 92 in the circumferential direction C. Thus, the first rolling elements 41a retained by the inner retaining member 91 and the second rolling elements 41b retained by the outer retaining member 92 are moved in the direction C1 or the direction C2, with the relative positions of the first rolling elements 41a and the second rolling elements 41b maintained accurately. Consequently, when the separators 82 of the switching member 80 move with rotation of the outer ring 33 of the output shaft 26, the clearances S3 or S4 are accurately formed between upstream ones of the rolling elements 41 in the direction of rotation (i.e., the first rolling elements 41a or the second rolling elements 41b) and the outer peripheral portion 34 or the inner peripheral portion 35.

Adjusting the length L enables adjustment of the spacing D between the rolling elements 41 of each pair during the on state (see FIG. 3) such that the engagement of the first rolling elements 41a with the outer peripheral portion 34 and the inner peripheral portion 35 and the engagement of the second rolling elements 41b with the outer peripheral portion 34 and the inner peripheral portion 35 will not be effected simultaneously during the on state.

The invention is not limited to the embodiments described above. Various changes and modifications may be made within the scope of the invention defined by the claims.

What is claimed is:

1. A driving force transmission apparatus disposed between a first shaft and a second shaft that are coaxial with each other, the apparatus being configured to switch between an on state in which a rotational force is transmitted between the first shaft and the second shaft and an off state in which no rotational force is transmitted between the first shaft and the second shaft, the apparatus comprising:
   an outer peripheral portion disposed on the first shaft;
   an inner peripheral portion disposed on the second shaft, the inner peripheral portion facing the outer peripheral portion;
   a space defined between the outer peripheral portion and the inner peripheral portion, the space including at least one relatively large sub-space and at least two relatively small sub-spaces, the relatively small and relatively large sub-spaces being disposed alternately in a circumferential direction of the first and second shafts;
   at least one pair of rolling elements disposed in the space;
   an elastic body to elastically urge the rolling elements of the at least one pair away from each other in the circumferential direction;
   a retainer to retain the rolling elements in the space, the retainer including a pair of retaining members each retaining an associated one of the rolling elements of the at least one pair;
   a switching member disposed in the space so as to be displaceable in an axial direction of the first and second shafts, the axial direction including a first direction and a second direction opposite to the first direction; and
   a switching member assist to aid the switching member to rotate with rotation of the second shaft, with the switching member displaced in the second direction, wherein displacement of the switching member in the first direction causes the rolling elements of the at least one pair to move close to each other in the circumferential direction against elastic urging force from the elastic body and move to the relatively large sub-space, so that the rolling elements of the at least one pair each come out of engagement with the outer peripheral portion or the inner peripheral portion and each form a clearance therewith in the space, resulting in the off state of the apparatus, displacement of the switching member in the second direction causes the rolling elements of the at least one pair to move away from each other under the elastic urging force and move to the relatively small sub-spaces, so that a downstream one of the rolling elements of the at least one pair, in a direction of rotation of one of the first shaft and the second shaft relative to the other one of the first shaft and the second shaft, comes into zero clearance engagement with the outer peripheral portion and the inner peripheral portion, with a clearance formed between an upstream one of the rolling elements of the at least one pair in the direction of rotation and the outer peripheral portion or the inner peripheral portion, resulting in the on state of the apparatus, and the switching member includes a restrictor to restrict relative positions of the retaining members in the circumferential direction during the on state.

2. The apparatus according to claim 1, wherein the displacement of the switching member in the second direction enables the switching member to be rotatable with the rotation of the second shaft, and the switching member moves in the direction of rotation with the rotation of the second shaft so as to cause the upstream one of the rolling elements of the at least one pair in the direction of rotation to move, so that a clearance is formed between the upstream one of the rolling elements and the outer peripheral portion or the inner peripheral portion, and so that the upstream one of the rolling elements causes, through the elastic body, the downstream one of the rolling elements to come into zero clearance engagement with the outer peripheral portion and the inner peripheral portion.

3. The apparatus according to claim 1, wherein the at least one relatively large sub-space includes at least three relatively large sub-spaces, the at least two relatively small sub-spaces include at least three relatively small sub-spaces, the at least three relatively large sub-spaces and the at least three relatively small sub-spaces are disposed alternately in the circumferential direction, the at least one pair of rolling elements includes three pairs of rolling elements, and the switching member includes
a ring body concentric with the first shaft, and
three separators protruding from the ring body in the axial direction.

4. The apparatus according to claim 2, wherein the at least one relatively large sub-space includes at least three relatively large sub-spaces, the at least two relatively small sub-spaces include at least three relatively small sub-spaces, the at least three relatively large sub-spaces and the at least three relatively small sub-spaces are disposed alternately in the circumferential direction, the at least one pair of rolling elements includes three pairs of rolling elements, and the switching member includes
a ring body concentric with the first shaft, and
three separators protruding from the ring body in the axial direction.

* * * * *